United States Patent
Gupta et al.

(10) Patent No.: US 12,190,215 B1
(45) Date of Patent: Jan. 7, 2025

(54) AUTOMATICALLY SELECTING RELEVANT DATA BASED ON USER SPECIFIED DATA AND MACHINE LEARNING CHARACTERISTICS FOR DATA INTEGRATION

(71) Applicant: International Business Machines Corporation, Armonk, NY (US)

(72) Inventors: Nitin Gupta, Saharanpur (IN); Shashank Mujumdar, Nagpur (IN); Ruhi Sharma Mittal, Bengaluru (IN); Hima Patel, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/494,345

(22) Filed: Oct. 25, 2023

(51) Int. Cl.
    G06F 16/00      (2019.01)
    G06F 16/2457   (2019.01)
    G06N 20/00     (2019.01)

(52) U.S. Cl.
    CPC ....... G06N 20/00 (2019.01); G06F 16/24573 (2019.01); G06F 16/24578 (2019.01)

(58) Field of Classification Search
    CPC ............ G06F 16/24573; G06F 16/24578
    See application file for complete search history.

(56) References Cited

U.S. PATENT DOCUMENTS

| | | | |
|---|---|---|---|
| 8,690,666 B2 | 4/2014 | Nathanson | |
| 9,778,931 B2 | 10/2017 | Todd et al. | |
| 10,650,000 B2 | 5/2020 | Oberbreckling et al. | |
| 11,163,527 B2 | 11/2021 | Oberbreckling et al. | |
| 2013/0151423 A1 | 6/2013 | Schmidt et al. | |
| 2015/0170055 A1* | 6/2015 | Beymer | G06N 20/00 706/12 |
| 2019/0179937 A1* | 6/2019 | Banerjee | G06F 16/24 |
| 2019/0317961 A1 | 10/2019 | Brener et al. | |
| 2021/0326334 A1 | 10/2021 | Shrivastava et al. | |
| 2022/0044136 A1 | 2/2022 | Wang et al. | |
| 2022/0138561 A1 | 5/2022 | Prendki | |
| 2022/0335311 A1* | 10/2022 | Lahlou | G06N 3/084 |
| 2023/0004869 A1* | 1/2023 | Modarresi | G06F 16/2264 |
| 2023/0214451 A1* | 7/2023 | Trabaud | G06N 3/08 382/159 |
| 2023/0214515 A1* | 7/2023 | Ye | G06N 20/00 726/26 |
| 2023/0289592 A1* | 9/2023 | Badri | G06F 18/2155 |
| 2023/0306023 A1* | 9/2023 | Na | G06Q 10/04 |
| 2024/0061867 A1* | 2/2024 | Wolfe | G06F 16/285 |

* cited by examiner

Primary Examiner — Khanh B Pham
(74) Attorney, Agent, or Firm — Yee & Associates, P.C.

(57) ABSTRACT

Automatically selecting data for machine learning datasets is provided. The method comprises receiving an input dataset and user-specified data quality metrics. The input dataset is matched to a subset of candidate datasets in a repository according to schema characteristics. A second subset of candidate datasets having a distance from the input dataset above a specified threshold is selected from the first subset of candidate datasets. The second subset of candidate datasets are merged into a merged dataset. Top ranked samples above a specified second threshold are identified from the merged dataset based on the user-specified data quality metrics. The input dataset, augmented with the top ranked samples, is returned to the user.

20 Claims, 7 Drawing Sheets

AUTOMATICALLY SELECTING RELEVANT DATA BASED ON USER SPECIFIED DATA AND MACHINE LEARNING CHARACTERISTICS FOR DATA INTEGRATION

BACKGROUND

The present disclosure relates generally to an improved computing system, and more specifically to generating datasets for machine learning models.

Data is a key element of any analysis or learning based task to derive various insights and drives many business-critical decisions. In data flow and machine learning model creation, there are several important data phases such as data acquisition, data recommendation, data integration, and data merging. Model learning is strongly dependent on the quality and sufficient of training data.

SUMMARY

An illustrative embodiment provides a computer-implemented method for automatically selecting data for machine learning datasets. The method comprises receiving an input dataset and user-specified data quality metrics. The input dataset is matched to a subset of candidate datasets in a repository according to schema characteristics. A second subset of candidate datasets having a distance from the input dataset above a specified threshold is selected from the first subset of candidate datasets. The second subset of candidate datasets are merged into a merged dataset. Top ranked samples above a specified second threshold are identified from the merged dataset based on the user-specified data quality metrics. The input dataset, augmented with the top ranked samples, is returned to the user. According to other illustrative embodiments, a computer system, and a computer program product for automatically selecting data for machine learning datasets are provided.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
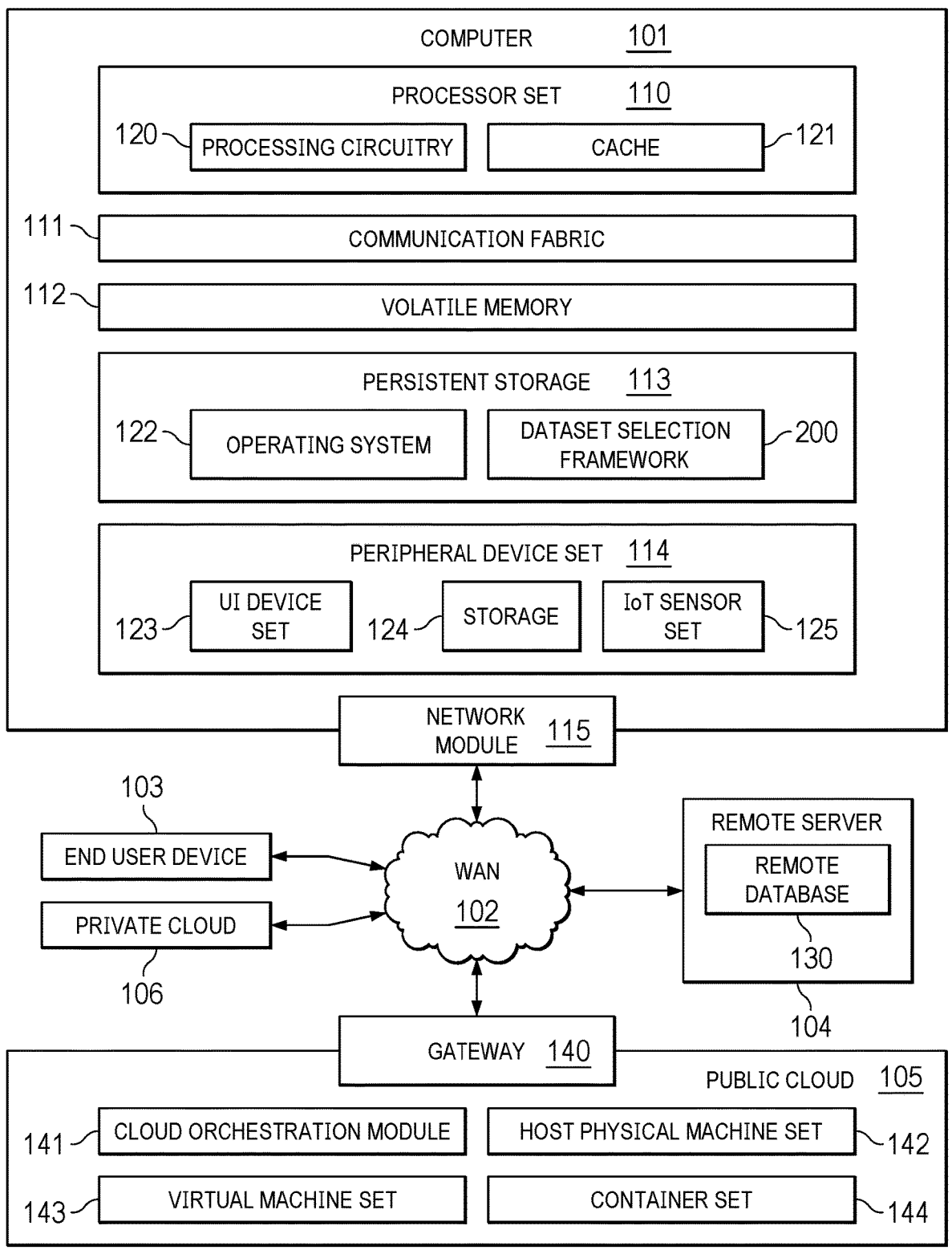
FIG. 1 depicts a pictorial representation of a computing environment in which illustrative embodiments may be implemented.

With reference now to the figures, and in particular, with reference to FIG. 1, a diagram of a data processing environment is provided in which illustrative embodiments may be implemented. It should be appreciated that FIG. 1 is only meant as an example and are not intended to assert or imply any limitation with regard to the environments in which different embodiments may be implemented. Many modifications to the depicted environment may be made.

FIG. 1 depicts a pictorial representation of a computing environment in which illustrative embodiments may be implemented. Computing environment 100 contains an example of an environment for the execution of at least some of the computer code involved in performing the inventive methods, such as data selection framework 200. In addition to data selection framework 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and data selection framework 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer, or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in data selection framework 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid state storage devices. Operating system 122 may take several forms, such as various known proprietary operating systems or open source Portable Operating System Interface-type operating systems that employ a kernel. Data selection framework instructions included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The illustrative embodiments recognize and take into account that most of the time, end users blindly combine data from several sources to create a larger training dataset. However, more data does not always mean good data.

The illustrative embodiments also recognize and take into account that manually identifying data characteristics, profiling data, integrating data, selecting subsets of data, etc. are challenging and time consuming and often infeasible. Generating synthesized data may not be good enough to match real data specifications. Furthermore, synthesized data may not guarantee good quality and improve machine learning downstream if the data does not have meaningful contents as well as good quality.

The illustrative embodiments provide a method for automatically selecting relevant samples from existing datasets based on user specified characteristics such as quality metrics and machine learning model performance metrics for data integration and acquisition.

Figure 2:
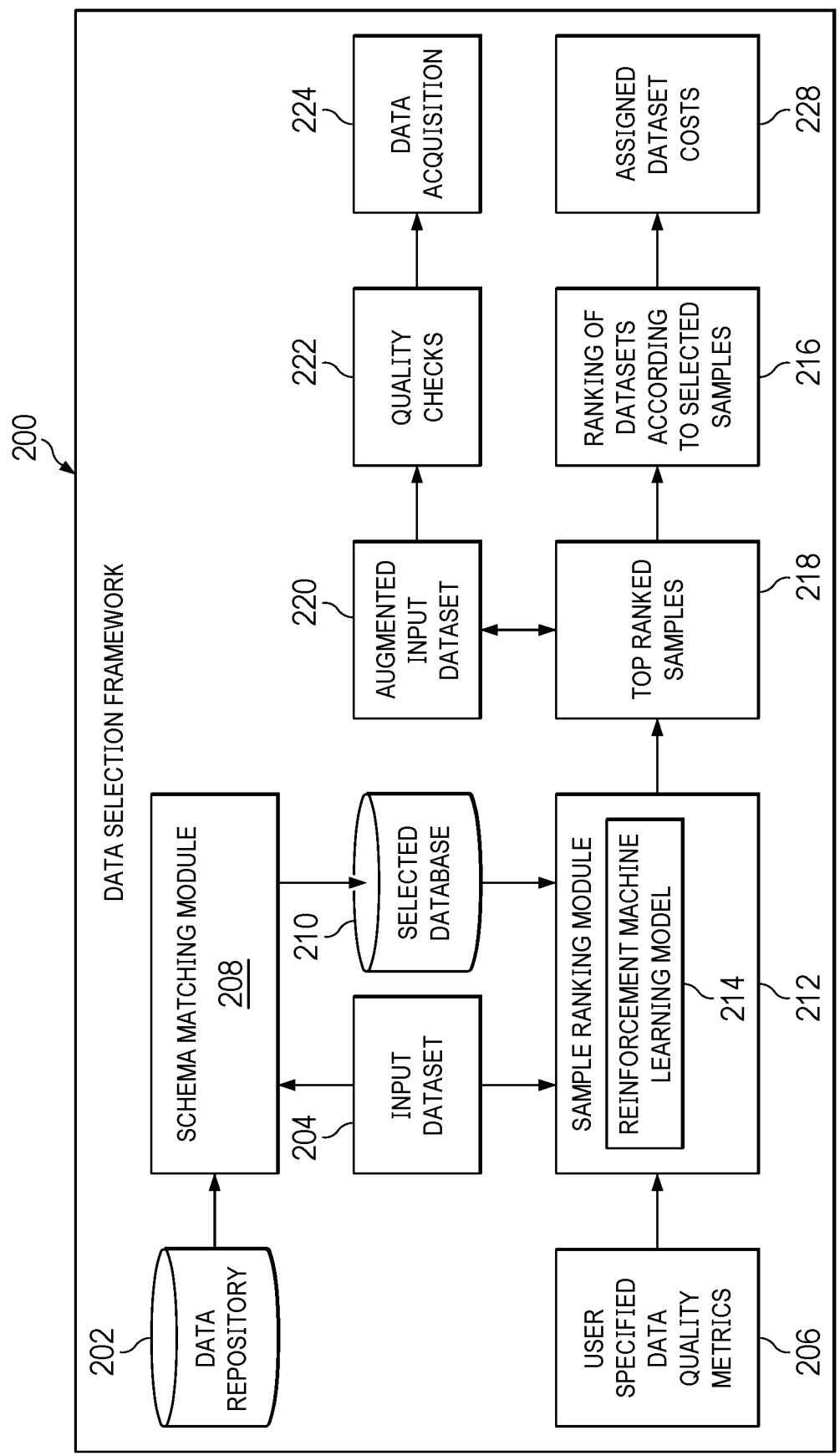
FIG. 2 depicts a block diagram for a data selection framework in accordance with an illustrative embodiment.

FIG. 2 depicts a block diagram for a data selection framework in accordance with an illustrative embodiment. Data selection framework 200 can be implemented in computing environment 100 in FIG. 1.

Data selection framework 200 comprises a schema matching module 208 and a sample ranking module 212. An input dataset 204 is fed into both modules, which operate to expand the input dataset 204 with additional data (samples) that will improve machine learning according to user needs.

Schema matching module 208 cross references the input dataset 204 with other datasets stored in a dataset repository 202. By comparing the schema of the input dataset 204 with the schemas of candidate datasets in the dataset repository 202, the schema matching module can select datasets that most closely resemble the input dataset 204.

In the input dataset 204 is also fed into sample ranking module 212 along with user specified data quality metrics 206. Sample ranking module 212 determines which of the selected datasets 210 selected by schema matching module 208 are most similar to the input dataset 204. Sample ranking module 212 uses a reinforcement machine learning model 214 to determine the top ranked sample 218 from the selected datasets 210, which can provide a ranking of datasets 216 according to the respective number of the top ranked samples 218 chosen from the datasets.

The top ranked samples 218 can be merged with the input dataset 204 to produce an augmented input dataset 220 for use in machine learning.

Ranking of the datasets 216 can be applied for dataset shopping by assigning costs 228 to each of the datasets. The assigned costs 228 indicate how important a dataset is according to the number of samples chosen from that dataset.

Quality checks 222 are applied to the augmented input dataset 220 for data acquisition 224. The quality checks 222 look for overlap regions in the augmented input dataset 220, regions with less distribution in imbalanced classes, as well as other metrics to determine representative samples for further annotation that will improve the quality metrics.

Figure 3:
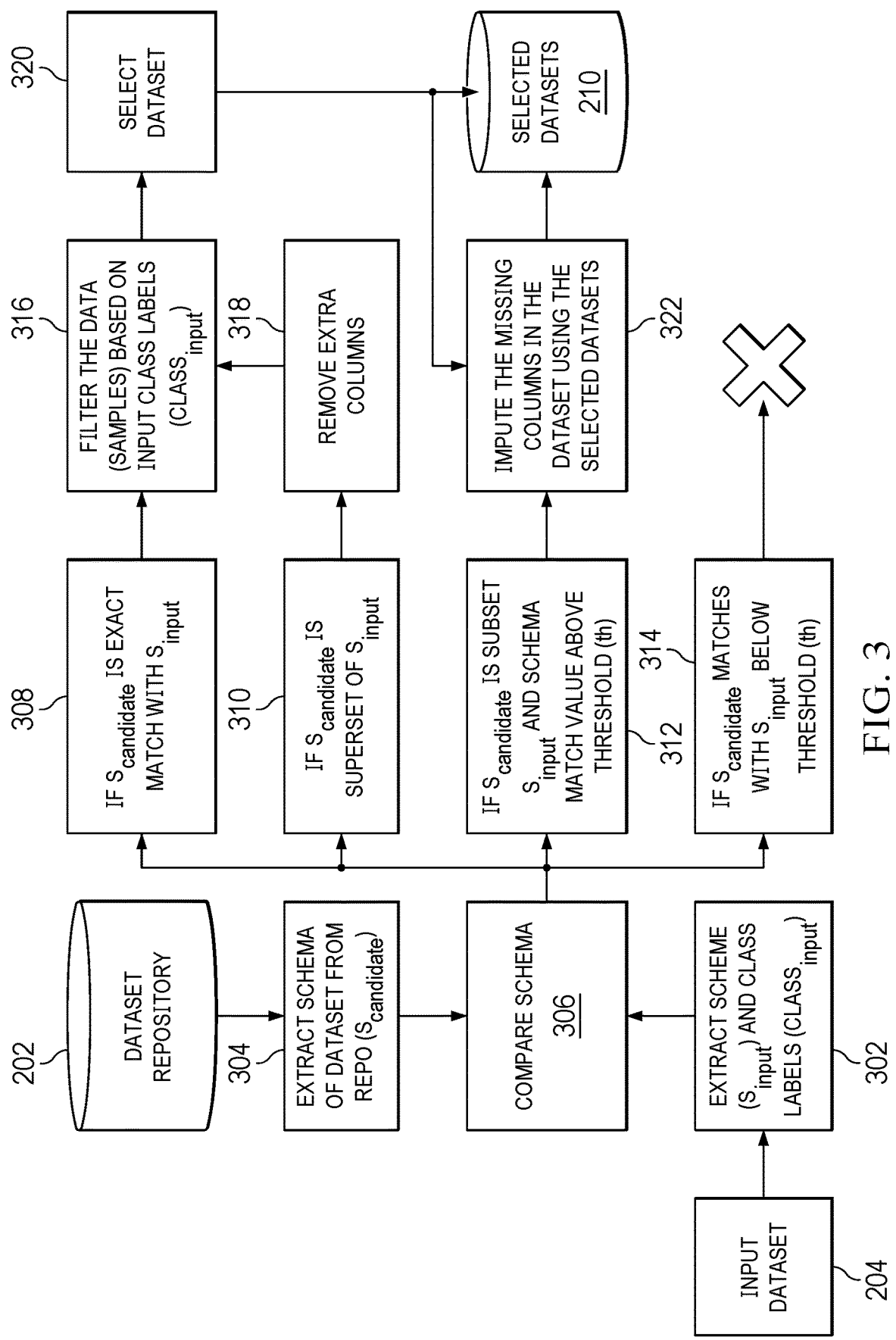
FIG. 3 depicts a block diagram illustrating the operation of the schema matching module in accordance with an illustrative embodiment.

FIG. 3 depicts a block diagram illustrating the operation of the schema matching module 208 in accordance with an illustrative embodiment. When the schema matching module receives input dataset 204 it extracts the schema ($S_{input}$) and input class labels ($Class_{input}$) from the input dataset (step 302). Similarly, it also extracts the respective schema ($S_{candidate}$) from each dataset in the dataset repository 202 (step 304). The schema matching module then compares $S_{input}$ to each $S_{candidate}$ (step 306).

If a candidate schema $S_{candidate}$ is an exact match to the input schema $S_{input}$ (308), the schema matching module filters the data (samples) in the candidate dataset based on the input class labels extracted from the input dataset 204 (step 316) and selects the dataset (step 320).

If the candidate schema $S_{candidate}$ is a superset of input schema $S_{input}$ (310) the schema matching module first removes the extra columns (step 318) before filtering the data according to the input class labels and selecting the dataset.

If the candidate schema $S_{candidate}$ is a subset of input schema $S_{input}$ that matches $S_{input}$ above a specified matching threshold (312) the schema matching module imputes missing columns in the dataset using previously selected datasets (step 322) before being added to the selected datasets 210.

If the candidate schema $S_{candidate}$ is a subset of input schema $S_{input}$ that matches $S_{input}$ below specified matching threshold (314), the dataset is not selected.

Figure 4:
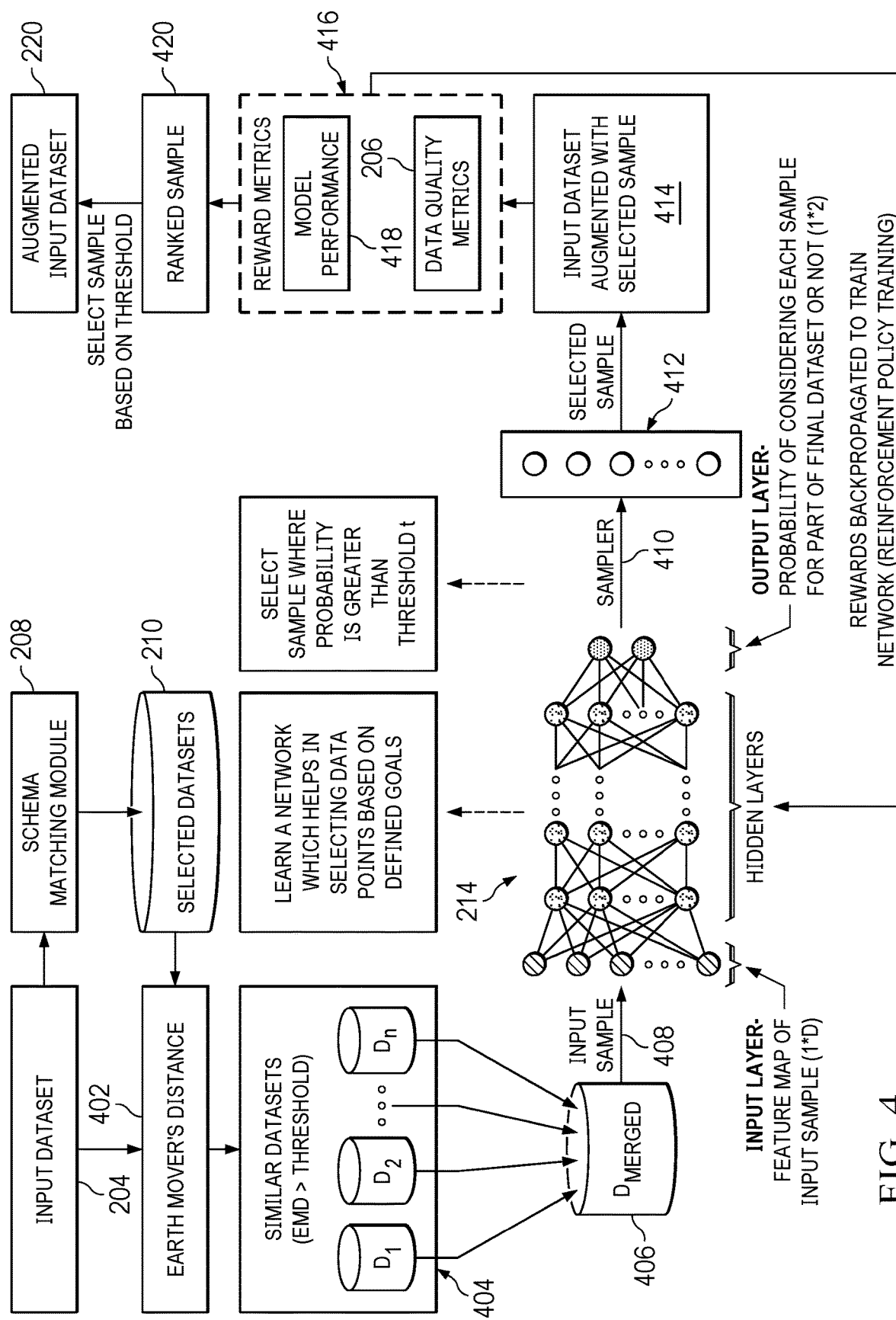
FIG. 4 depicts a block diagram illustrating the operation of the sample ranking module in accordance with an illustrative embodiment.

FIG. 4 depicts a block diagram illustrating the operation of the sample ranking module 212 in accordance with an illustrative embodiment. The sample ranking module calculates the earth mover's distance (EMD) 402 between the input dataset 204 and each of the selected datasets 210 selected by the schema matching module.

Similar datasets 404 among the selected datasets 210 with an EMD above a specified distance threshold are combined into a merged dataset ($D_{merged}$) 406. An input sample 408 is selected from the merged dataset 406 and fed into the reinforcement machine learning model 214 which selects data points based on defined goals provided by a user and calculated a probability of considering each sample from the merged dataset 406 for part of the final augmented input dataset 220.

A sample 410 selects samples that have a probability of selection greater than a selection threshold t. Each of the selected samples 412 is added to the input dataset 204 to create a provisional augmented input dataset 414 for evaluation of performance.

Model performance 418 of classifiers using the provisional augmented input dataset 414 is used, along with the user specified data quality metrics 206, as reward metrics 416 that are back propagated for training the reinforcement machine learning model 214.

Model performance 418 and data quality metrics 206 enable ranking of the sample used in the provisional augmented input dataset 414. If the ranked sample 420 is above a specified rank threshold it is selected for the final augmented input dataset 220. The back propagation of reward metrics 416 enables the reinforcement machine learning model 214 to get better at predicting which samples from the merged dataset 406 are going to be selected for inclusion in the final augmented input dataset 220.

Figure 5:
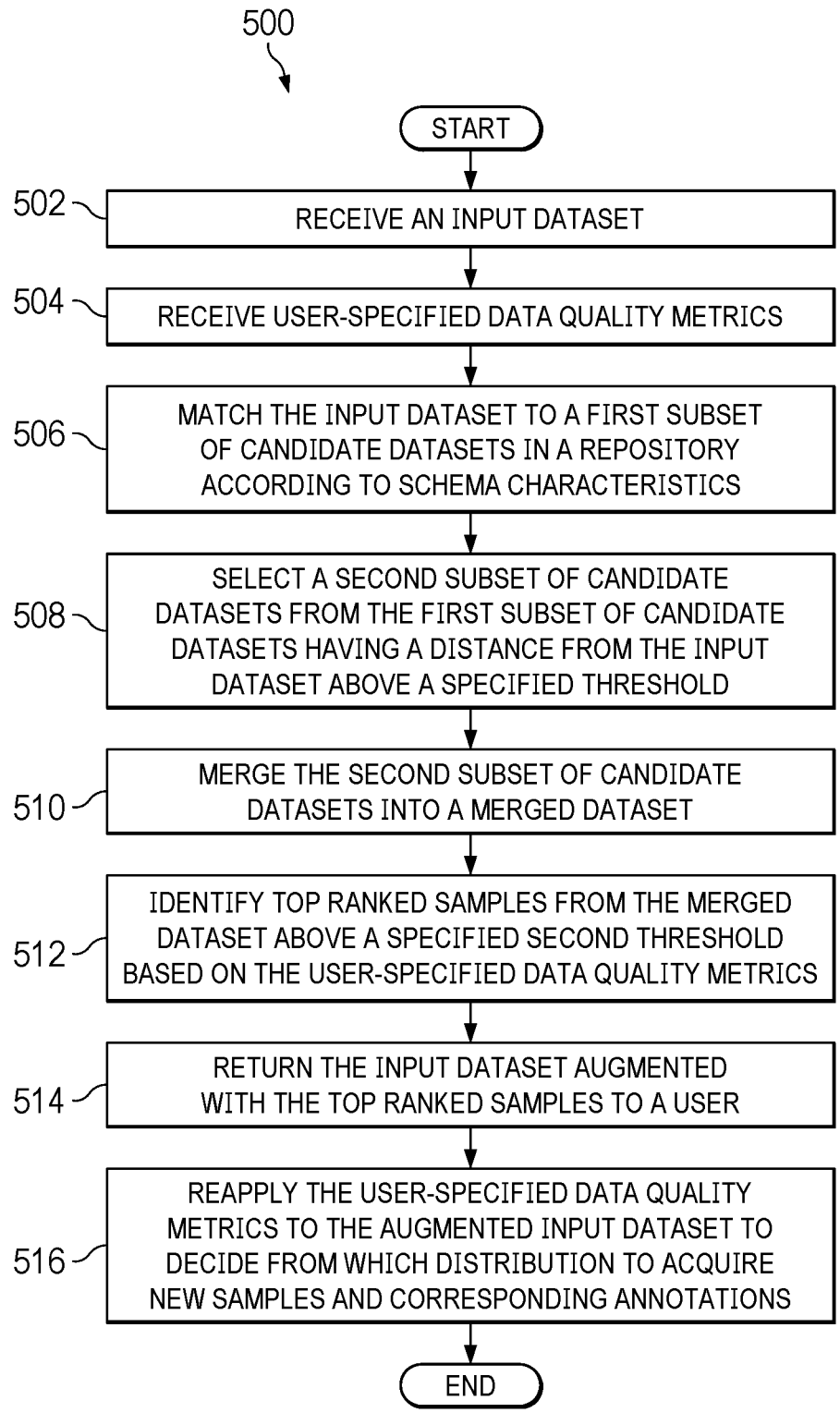
FIG. 5 depicts a flowchart of a process for selecting data for machine learning datasets in accordance with an illustrative embodiment.

FIG. 5 depicts a flowchart of a process for selecting data for machine learning datasets in accordance with an illustrative embodiment. Process 500 can be in computing environment 100 in FIG. 1 and data selection framework 200 in FIG. 2.

Process 500 begins by receiving an input dataset (step 502) and receiving user-specified data quality metrics (step 504). Process 500 matches the input dataset to a first subset of candidate datasets in a repository according to schema characteristics (step 506).

A second subset of candidate datasets is selected from the first subset of candidate datasets having a distance from the input dataset above a specified threshold (step 508). This second subset of candidate datasets are then merged into a merged dataset (step 510).

Process 500 identifies top ranked samples from the merged dataset above a specified second threshold based on the user-specified data quality metrics (step 512) and returns the input dataset augmented with the top ranked samples to a user (step 514).

The user-specified data quality metrics may be reapplied be to the augmented input dataset to decide from which distribution to acquire new samples and corresponding annotations (step 516).

Process 500 then ends.

Figure 6:
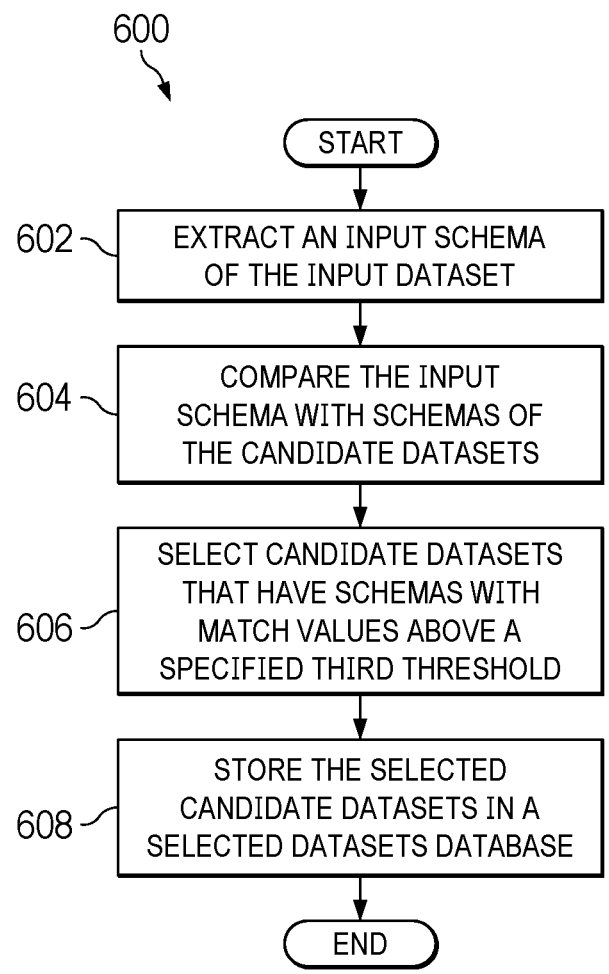
FIG. 6 depicts a flowchart of a process for matching the input dataset to the first subset of candidate datasets in accordance with an illustrative embodiment.

FIG. 6 depicts a flowchart of a process for matching the input dataset to the first subset of candidate datasets in accordance with an illustrative embodiment. Process in 600 is a detailed example of step 506 in FIG. 5.

Process 600 begins by extracting an input schema of the input dataset (step 602) and comparing the input schema with schemas of the candidate datasets (step 604).

Candidate datasets that have schemas with match values above a specified third threshold are selected (step 606), and the selected candidate datasets are stored in a selected datasets database (step 608).

Process 600 then ends.

Figure 7:
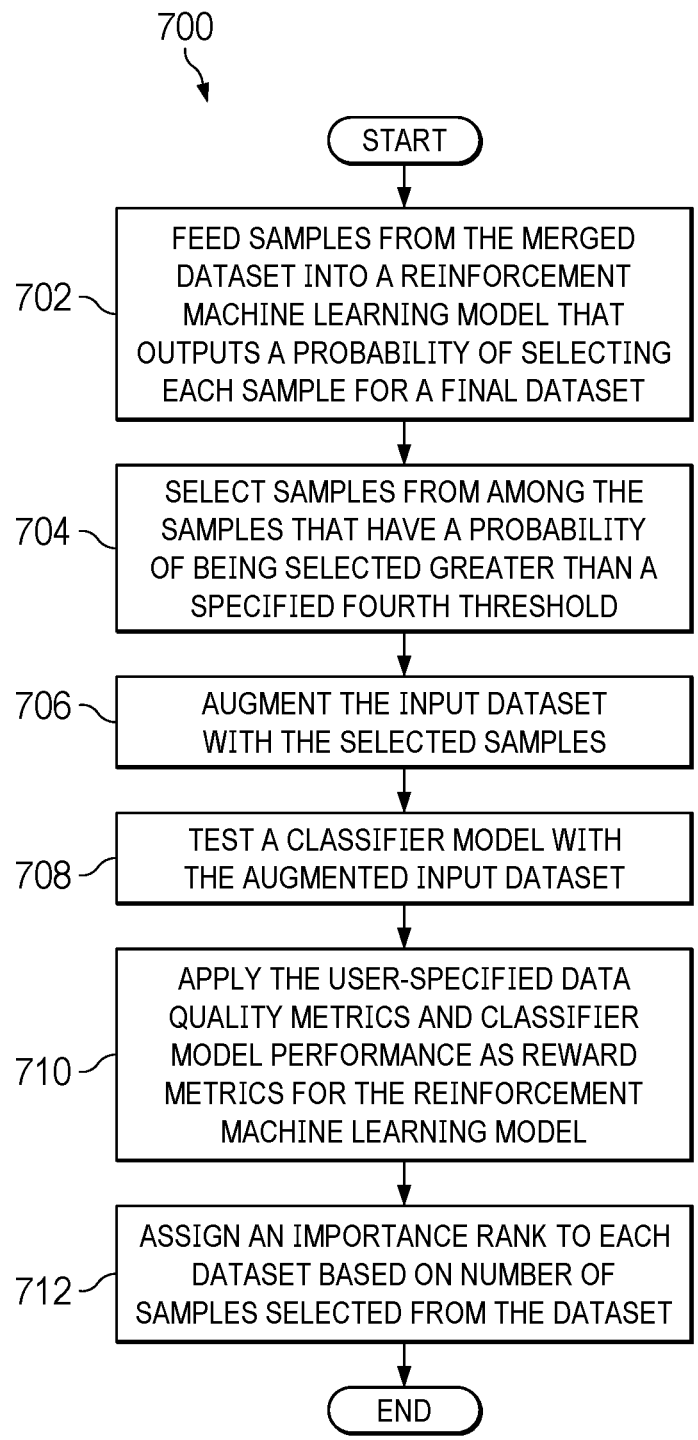
FIG. 7 depicts a flowchart of a process for identifying top ranked samples from the merged dataset in accordance with an illustrative embodiment.

FIG. 7 depicts a flowchart of a process for identifying top ranked samples from the merged dataset in accordance with an illustrative embodiment. Process in 700 is a detailed example of step 512 in FIG. 5.

Process 700 begins by feeding samples from the merged dataset into a reinforcement machine learning model that outputs a probability of selecting each sample for a final dataset (step 702).

Samples are selected from among the samples that have a probability of being selected greater than a specified fourth threshold (step 704). The input dataset is augmented with the selected samples (step 706).

Process 700 then tests a classifier model with the augmented input dataset (step 708). The user-specified data quality metrics and classifier model performance are fed back and used as reward metrics for the reinforcement machine learning model (step 710).

Process 700 may assign an importance rank to each dataset based on number of samples selected from the dataset (step 712).

Process 700 then ends.

As used herein, a "number of," when used with reference to objects, means one or more objects. For example, a "number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As used herein, a "computer instruction," or "computer program", means one step or a set of steps that includes information on how to operate, perform, or maintain particular computer software or hardware. For example, a "computer instruction" can be a computer program instruction in the form of lines of code or source code that are executable by a computer system.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present disclosure have been presented for purposes of illustration but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implemented method of automatically selecting data for machine learning datasets, the method comprising:
    using a number of processors to perform:
        receiving an input dataset;
        receiving user-specified data quality metrics;
        matching the input dataset to a first subset of candidate datasets in a repository according to schema characteristics;
        selecting a second subset of candidate datasets from the first subset of candidate datasets having a distance from the input dataset above a specified threshold;
        merging the second subset of candidate datasets into a merged dataset;
        identifying top ranked samples from the merged dataset above a specified second threshold based on the user-specified data quality metrics wherein the identification of top ranked samples from the merged dataset comprises:
            feeding samples from the merged dataset into a reinforcement machine learning model that outputs a probability of selecting each sample for a final dataset;
            selecting samples from among the samples that have a probability of being selected greater than a specified fourth threshold; and
            augmenting the input dataset with the selected samples; and
        returning the input dataset augmented with the top ranked samples to a user.

2. The method of claim 1, wherein matching the input dataset to the first subset of candidate datasets in the repository further comprises:
    extracting an input schema of the input dataset;
    comparing the input schema with schemas of the candidate datasets;
    selecting candidate datasets that have schemas with match values above a specified third threshold; and
    storing the selected candidate datasets in a selected datasets database.

3. The method of claim 2, wherein responsive to a determination that a candidate dataset has a schema that is the same as the input schema, filtering data from the candidate dataset based on input class labels before selecting the candidate dataset.

4. The method of claim 2, wherein responsive to a determination that a candidate dataset has a schema that is a superset of the input schema, removing extra columns from the candidate dataset before filtering the data based on input class labels.

5. The method of claim 2, wherein responsive to a determination that a candidate dataset has a schema that is a subset of the input schema, imputing missing columns in the candidate dataset based previously selected datasets.

6. The method of claim 1, wherein identifying top ranked samples from the merged dataset further comprises:
    testing a classifier model with the augmented input dataset; and
    applying the user-specified data quality metrics and classifier model performance as reward metrics for the reinforcement machine learning model.

7. The method of claim 6, further comprising assigning an importance rank to each dataset based on a number of samples selected from the dataset.

8. The method of claim 1, further comprising reapplying the user-specified data quality metrics to the augmented input dataset to decide from which distribution to acquire new samples and corresponding annotations.

9. A system for automatically selecting data for machine learning datasets, the system comprising:
    a storage device that stores program instructions;
    one or more processors operably connected to the storage device and configured to execute the program instructions to cause the system to:
        receive an input dataset;
        receive user-specified data quality metrics;
        match the input dataset to a first subset of candidate datasets in a repository according to schema characteristics;
        select a second subset of candidate datasets from the first subset of candidate datasets having a distance from the input dataset above a specified threshold;
        merge the second subset of candidate datasets into a merged dataset;
        identify top ranked samples from the merged dataset above a specified second threshold based on the user-specified data quality metrics wherein the identification of top ranked samples from the merged dataset comprises:
            feeding samples from the merged dataset into a reinforcement machine learning model that outputs a probability of selecting each sample for a final dataset;
            selecting samples from among the samples that have a probability of being selected greater than a specified fourth threshold; and
            augmenting the input dataset with the selected samples; and
        return the input dataset augmented with the top ranked samples to a user.

10. The system of claim 9, wherein the program instructions that cause the system to match the input dataset to the first subset of candidate datasets in the repository further cause the system to:
    extract an input schema of the input dataset;
    compare the input schema with schemas of the candidate datasets;
    select candidate datasets that have schemas with match values above a specified third threshold; and
    store the selected candidate datasets in a selected datasets database.

11. The system of claim 10, wherein responsive to a determination that a candidate dataset has a schema that is the same as the input schema, filtering data from the candidate dataset based on input class labels before selecting the candidate dataset.

12. The system of claim 10, wherein responsive to a determination that a candidate dataset has a schema that is a superset of the input schema, removing extra columns from the candidate dataset before filtering the data based on input class labels.

13. The system of claim 10, wherein responsive to a determination that a candidate dataset has a schema that is a subset of the input schema, imputing missing columns in the candidate dataset based previously selected datasets.

14. The system of claim 9, wherein the program instructions that cause the system to identify the top ranked samples from the merged dataset further cause the system to:
    test a classifier model with the augmented input dataset; and
    apply the user-specified data quality metrics and classifier model performance as reward metrics for the reinforcement machine learning model.

15. The system of claim 14, wherein the program instructions further cause the system to assign an importance rank to each dataset based on a number of samples selected from the dataset.

16. The system of claim 9, wherein the program instructions further cause the system to reapply the user-specified data quality metrics to the augmented input dataset to decide from which distribution to acquire new samples and corresponding annotations.

17. A computer program product for automatically selecting data for machine learning datasets, the computer program product comprising:
    a persistent storage medium having program instructions configured to cause one or more processors to:
        receive an input dataset;
        receive user-specified data quality metrics;
        match the input dataset to a first subset of candidate datasets in a repository according to schema characteristics;
        select a second subset of candidate datasets from the first subset of candidate datasets having a distance from the input dataset above a specified threshold;
        merge the second subset of candidate datasets into a merged dataset;
        identify top ranked samples from the merged dataset above a specified second threshold based on the user-specified data quality metrics wherein the identification of top ranked samples from the merged dataset comprises:
            feeding samples from the merged dataset into a reinforcement machine learning model that outputs a probability of selecting each sample for a final dataset;
            selecting samples from among the samples that have a probability of being selected greater than a specified fourth threshold; and
            augmenting the input dataset with the selected samples; and
        return the input dataset augmented with the top ranked samples to a user.

18. The computer program product of claim 17, wherein matching the input dataset to the first subset of candidate datasets in the repository comprises:
- extracting an input schema of the input dataset;
- comparing the input schema with schemas of the candidate datasets;
- selecting candidate datasets that have schemas with match values above a specified third threshold; and
- storing the selected candidate datasets in a selected datasets database.

19. The computer program product of claim 17, wherein identifying top ranked samples from the merged dataset comprises:
- testing a classifier model with the augmented input dataset; and
- applying the user-specified data quality metrics and classifier model performance as reward metrics for the reinforcement machine learning model.

20. The computer program product of claim 19, further comprising instructions for assigning an importance rank to each dataset based on a number of samples selected from the dataset.

* * * * *